United States Patent
Bates

(10) Patent No.: US 9,870,252 B2
(45) Date of Patent: Jan. 16, 2018

(54) MULTI-THREADED PROCESSING WITH REDUCED CONTEXT SWITCHING

(71) Applicant: Sony Interactive Entertainment Inc., Tokyo (JP)

(72) Inventor: John P. Bates, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 177 days.

(21) Appl. No.: 14/078,867

(22) Filed: Nov. 13, 2013

(65) Prior Publication Data

US 2014/0075450 A1    Mar. 13, 2014

Related U.S. Application Data

(63) Continuation of application No. 11/839,492, filed on Aug. 15, 2007, now Pat. No. 8,589,943.

(51) Int. Cl.
   *G06F 9/46* (2006.01)

(52) U.S. Cl.
   CPC .................................. *G06F 9/461* (2013.01)

(58) Field of Classification Search
   CPC ....................................................... G06F 9/461
   See application file for complete search history.

(56) References Cited

U.S. PATENT DOCUMENTS

| | | | |
|---|---|---|---|
| 5,613,114 A | 3/1997 | Anderson et al. | |
| 5,758,184 A | 5/1998 | Lucovsky et al. | |
| 6,088,779 A | 7/2000 | Bharadhwaj | |
| 6,317,774 B1 | 11/2001 | Jones et al. | |
| 6,510,448 B1 | 1/2003 | Churchyard | |
| 6,845,501 B2 | 1/2005 | Thompson et al. | |
| 8,589,943 B2 | 11/2013 | Bates | |
| 2004/0049654 A1 | 3/2004 | Chrysanthakopoulos et al. | |
| 2005/0188372 A1 | 8/2005 | Inoue et al. | |
| 2005/0188373 A1 | 8/2005 | Inoue et al. | |
| 2006/0112377 A1 | 5/2006 | Nacul et al. | |
| 2006/0117316 A1 | 6/2006 | Cismas et al. | |
| 2006/0190942 A1 | 8/2006 | Inoue et al. | |
| 2006/0271938 A1 | 11/2006 | Gootherts et al. | |
| 2007/0074206 A1 | 3/2007 | Iwamoto | |
| 2007/0074207 A1 | 3/2007 | Bates et al. | |
| 2007/0074212 A1 | 3/2007 | Bates et al. | |
| 2007/0074221 A1 | 3/2007 | Stenson et al. | |
| 2007/0083755 A1 | 4/2007 | Iwamoto | |

(Continued)

FOREIGN PATENT DOCUMENTS

JP    2007052511    1/2007

OTHER PUBLICATIONS

Final Office Action for U.S. Appl. No. 11/839,492 dated Dec. 30, 2011.

(Continued)

*Primary Examiner* — Emerson Puente
*Assistant Examiner* — Steven Do
(74) *Attorney, Agent, or Firm* — JDI Patent; Joshua Isenberg; Robert Pullman

(57) ABSTRACT

Multi-threaded processing with reduced context switching is disclosed. Context switches may be avoided through the use of pre-emption notification, a pre-emption wait time attribute and a no-context-save yield.

33 Claims, 4 Drawing Sheets

(56) References Cited

U.S. PATENT DOCUMENTS

| | | | |
|---|---|---|---|
| 2007/0103215 A1* | 5/2007 | Boerstler | H03K 19/01852 327/175 |
| 2007/0198628 A1 | 8/2007 | Bates et al. | |
| 2008/0104610 A1 | 5/2008 | Norton et al. | |
| 2008/0165800 A1* | 7/2008 | Chen | G06F 9/526 370/465 |

OTHER PUBLICATIONS

International Search Report and Written Opinion of the International Searching Authority dated Nov. 4, 2008—International Patent Application No. PCT/US08/72150, 8 pages.
Non-Final Office Action for U.S. Appl. No. 11/839,492 dated Jun. 22, 2011.
Notice of Allowance for U.S. Appl. No. 11/839,492 dated Jul. 17, 2013.
Sony Computer Entertainment Incorporated , "Cell Broadband Engine Architecture", Version 1.0, Aug. 8, 2005.

* cited by examiner

MULTI-THREADED PROCESSING WITH REDUCED CONTEXT SWITCHING

CLAIM OF PRIORITY

This application is a continuation of U.S. patent application Ser. No. 11/839,492, to John P. Bates, filed Aug. 15, 2007, the entire contents of which are incorporated herein by reference.

FIELD OF THE INVENTION

This invention generally relates to parallel processing and more particularly to multi-threaded operation in parallel processors such as cell processors.

BACKGROUND OF THE INVENTION

A major advance in electronic computation has been the development of systems that can perform multiple operations simultaneously. Such systems are said to perform parallel processing. One type of parallel processing system, known as a Cell processor, has been developed to implement parallel processing on electronic devices ranging from hand-held game devices to main frame computers. A typical Cell processor has a main memory, power processor element (PPE) and up to 8 additional processor elements referred to as synergistic processing elements (SPE). Each SPE is typically a single chip or part of a single chip containing a processor known as a synergistic processor unit (SPU) and a local memory. All of the SPEs and the PPE can access the main memory, e.g., through a memory flow controller (MFC). The SPEs can perform parallel processing of operations in conjunction with a program miming on the PPE. The local memory associated with each SPU is relatively small, currently about 256 kilobytes in one common implementation. This memory must be managed by software to transfer code and data to/from the local SPE memories.

The SPE have a number of advantages in parallel processing applications. For example, the SPE are independent processors that can execute code with minimal involvement from the PPE. Each SPE has a high direct memory access (DMA) bandwidth to RAM. An SPE can typically access the main memory faster than the PPE. In addition each SPE has relatively fast access to its associated local store. The SPE also have limitations that can make it difficult to optimize SPE processing. For example, the SPE have no coherent memory and no hardware cache. In addition, many common programming models do not work well on SPE.

A typical SPE process involves retrieving code and/or data from the main memory, executing the code with the SPU to manipulate the data, and outputting results of the manipulation of the data to main memory or, in some cases, another SPU. To achieve high SPU performance it is desirable to optimize the above SPU process in relatively complex processing applications. For example, in applications such as computer graphics processing SPUs typically execute tasks thousands of times per frame.

One prior art task management system used for Cell processors and other types of processors is based on a software concept referred to as "threads". A "thread" generally refers to a part of a program that can execute independently of other parts. Operating systems that support multithreading enable programmers to design programs whose threaded parts can execute concurrently. When a thread is interrupted, a context switch may swap out the contents of an SPE's local storage to the main memory and substitute 256 kilobytes of data and/or code into the local storage from the main memory where the substitute data and code are processed by the SPU. A context switch is the computing process of storing and restoring the state of a SPE or PPE (the context) such that multiple processes can share a single resource.

A typical context switch involves stopping a program miming on a processor and storing the values of the registers, program counter plus any other operating system specific data that may be necessary to the main memory. For example, to prevent a single process from monopolizing use of a processor certain parallel processor programs perform a timer tick at intervals ranging from about 60 ticks per second to about 100 ticks per second. If the process running on the processor is not completed a context switch is performed to save the state of the processor and a new process (often the task scheduler or "kernel") is swapped in. As used herein, the kernel refers to a central module of the operating system for the parallel processor. The kernel is typically the part of the operating system that loads first, and it remains in main memory. Typically, the kernel is responsible for memory management, process and task management.

Frequent context switches can be quite computationally intensive and time consuming, particularly for processors that have a lot of registers. As used herein, a register refers to a special, high-speed storage area within a processor. Typically, data must be represented in a register before it can be processed. For example, if two numbers are to be multiplied, both numbers must be in registers, and the result is also placed in a register. The register may alternatively contain the address of a memory location where data is to be stored rather than the actual data itself. Registers are particularly advantageous in that they can typically be accessed in a single cycle. Program compilers typically make use of as many software-configurable registers as are available when compiling a program.

One prior art task management system used for cell processors is known as SPU Threads. A "thread" generally refers to a part of a program that can execute independently of other parts. Operating systems that support multithreading enable programmers to design programs whose threaded parts can execute concurrently. SPU Threads operates by regarding the SPUs in a cell as processors for threads. A context switch may swap out the contents of an SPU's local storage to the main memory and substitute 256 kilobytes of data and/or code into the local storage from the main memory where the substitute data and code are processed by the SPU. A context switch is the computing process of storing and restoring the state of a SPU or PPE (the context) such that multiple processes can share a single resource. Context switches are usually computationally intensive and much of the design of operating systems is to optimize the use of context switches.

Unfortunately, interoperating with SPU Threads is not an option for high-performance applications. Applications based on SPU Threads have large bandwidth requirements and are processed from the PPU. Consequently SPU-threads based applications are not autonomous and tend to be slow. Because SPU Threads are managed from the PPU, SPU context switching (swapping out the current miming process on an SPU to another waiting process) takes too long. Avoiding PPU involvement in SPU management can lead to much better performance for certain applications To overcome these problems a system referred to as SPU Runtime System (SPURS) was developed. In SPURS, the memory of each SPU has loaded into it a kernel that performs scheduling of tasks handled by the SPU. Groups of these tasks are referred to as Tasksets. SPURS is described in PCT Application Publication number WO2007020739 to Keisuke Inoue and Seiji Murata entitled "SCHEDULING METHOD, AND SCHEDULING DEVICE", and in US Patent Application Publication No. 20050188373, to Keisuke Inoue, Tatsuya Iwamoto and Masahiro Yasue entitled "METHOD AND APPARATUS FOR TASK MANAGEMENT IN A MULTI-PROCESSOR SYSTEM", and in US Patent Application Publication No. 20050188372 to Keisuke Inoue and Tatsuya Iwamoto entitled "METHOD AND APPARATUS FOR PROCESSOR TASK MIGRATION IN A MULTI-PROCESSOR SYSTEM" and in US Patent Application Publication No. 20060190942 to Keisuke Inoue and Masahiro Yasue entitled "PROCESSOR TASK MIGRATION OVER A NETWORK IN A MULTI-PROCESSOR SYSTEM", the disclosures of all four of which are incorporated herein by reference.

In traditional Multi-Threading an operating system (OS) scheduler will pre-empt any running thread to make a scheduling decision. The OS may manage any number of software threads that are configured by applications. Processors have a fixed number of hardware threads that is often fewer than the number of software threads in an application. Consequently, the hardware threads must be shared by the software threads, e.g., by time-slicing or cooperative yielding. The number of hardware threads determines how many software threads can run concurrently. One hardware thread can only process one software thread at a time. The number of hardware threads is dependent on the type of processor hardware involved. For example, the PPE of the Cell Processor has two hardware threads. Co-processors and cache may be shared among different software threads. Each thread has associated with it a context, which contains information relevant to the state of execution of the thread. Such information may include the values stored in registers, a program counter value, and the like.

Current implementations of SPU Threads (also referred to as SPE Threads) for the Cell processor apply a traditional thread model to SPUs. The overhead for context switching these SPU Threads can be very high compared to traditional threads because the entire SPE Local Store (currently 256 KB) and SPU registers (currently about 2 KB) must be saved and restored by the PPE. Certain SPU threads need to run on a regular basis, e.g., in certain Cell processor-based video game applications a high priority SPU thread runs every 16 ms. Currently, if a group of ganged SPU threads are running on all available SPUs the entire gang must be swapped out even though the high priority SPU thread may only require one SPU. The purpose of the ganged SPU Thread Group is so that the SPU Threads can safely communicate between each other's SPU Local Stores. If they were split up into individual SPU Threads, communication between SPU Local Stores is not supported by certain Operating Systems.

In addition to being detrimental to performance, context switches are often unnecessary. For example, an application often has its context resident in main memory. The space available in SPU Local Store is usually not big enough to store everything an SPU will need. Consequently some data and/or code may be stored in main memory where it is managed by the application. It is therefore often redundant for the operating system to do the context switch.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
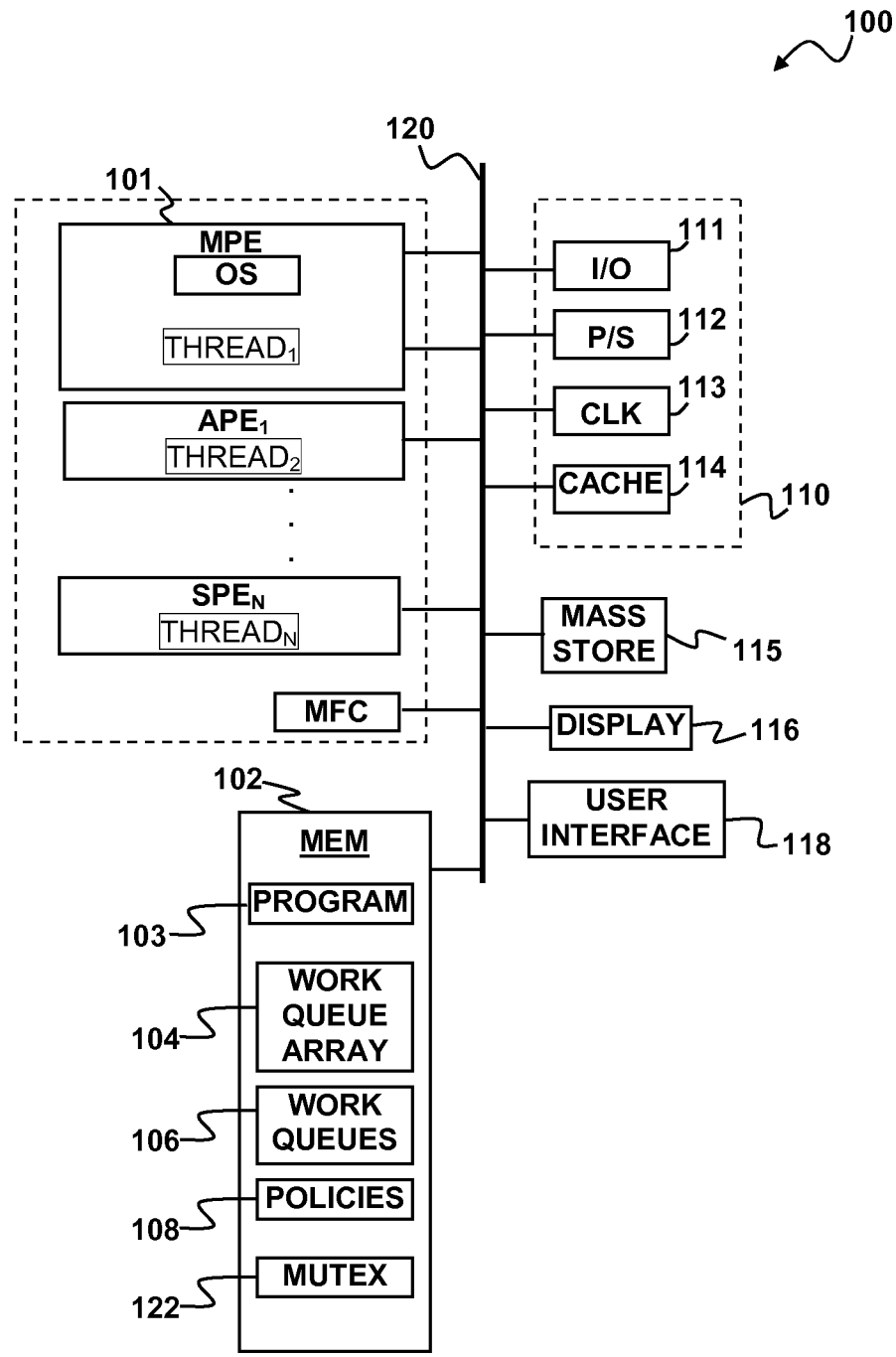
FIG. 1 is a schematic diagram of a computer system according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention present modifications of standard models of multi-threaded computer operation such as the SPU Thread model. As used herein, the term multi-threaded or multi-threading means that the operating system (OS) is configured such that different parts of a single program (called threads) may run concurrently. Although embodiments of the present invention may be applied to any multi-threaded computer system, the performance advantages may be most apparent on a system with the following characteristics:

a) The processing system includes an asymmetric multi-core processor, e.g., a PPE and SPE(s), as in a Cell Processor.
b) One or more limited cores (e.g., SPE) is of a type that cannot perform a full thread context switch on itself.
c) The remaining core(s) (e.g., PPE) must perform context switches in full or in part on behalf of the limited cores.
d) A context switch of the limited core processor results in undesired overhead for the system.

According to embodiments of the present invention a computer system having one or more processors coupled to a memory may implement multi-threaded processing in a way that significantly reduces the need for context switches or avoids them altogether. In particular an operating system may notify a first thread miming on one or more of the processors of a pre-emption by a second thread having a higher priority than the first thread. Such notification is referred to herein as pre-emption notification. The operating system may also notify the first thread of a time limit for pre-emption (referred to herein as a pre-emption wait time attribute) associated with the second thread. The application miming the first thread may yield the one the processor(s) held by the first thread to the second thread within the time limit without saving a context of the first thread if the first thread can wind up within the time limit. This process is referred to herein as a no-context-save yield. Alternatively, a context switch from the first thread to the second thread may be performed if the first thread cannot wind up within the time limit.

As discussed above, in traditional multi-threading the OS Scheduler will pre-empt any running thread to make a scheduling decision. In embodiments of the invention, by contrast, a computer system may be configured, e.g., through suitable programming, to provide more information from an application about a thread to allow the operating system (OS) to make a more cooperative scheduling decision. By way of example, the OS may notify an application that a certain low-priority thread will be pre-empted unless the application gives up the hardware thread within some specified amount of time. If the low-priority thread yields the hardware thread within the specified time, a new thread may be loaded into the hardware thread. If the low-priority thread cannot yield the hardware thread within the specified time, a conventional context switch may be performed.

Multi-threaded processing having the features described above may be implemented on a computing system 100, as depicted in FIG. 1. The computing system 100 may be a component of a device. Such devices include, but are not limited to personal computers, laptop computers, hand held internet browsers and/or email devices, Voice over Internet Protocol (VoIP) phones, video game consoles, hand-held video game devices, portable email devices, portable internet browsers and the like. In a preferred embodiment, the system 100 is a component of a video game console. The system 100 may include processor module 101 and a memory 102 (e.g., RAM, DRAM, ROM, and the like). In some embodiments, the processing system 100 may have multiple cell processor modules 101. The processor module 101 generally includes a main processor element MPE and one or additional processor elements $APE_1 \ldots APE_N$. The additional processor elements may each include an associated local memory. Each additional processor may run code and/or store data associated with one or more threads. By way of example, the additional processor elements may be processors of the same type as the main processor element. Such a configuration is sometimes referred to as a multi-core processor, e.g., a dual core or quad-core or processor. Alternatively, the additional processor elements may be co-processor elements or synergistic processor elements. The term co-processor generally refers to a special-purpose processing unit that assists a central processing unit (CPU) in performing certain types of operations. Examples of coprocessors include math coprocessors that perform mathematical computations, such as floating-point operations. Math coprocessors are sometimes also called numeric and floating-point coprocessors. In addition, coprocessors include graphics coprocessors (sometimes called accelerator boards) that are used to manipulate graphics images.

The system 100 may also include well-known support functions 110, such as input/output (I/O) elements 111, power supplies (P/S) 112, a clock (CLK) 113 and cache 114. The system 100 may optionally include a mass storage device 115 such as a disk drive, CD-ROM drive, tape drive, or the like to store programs and/or data. The controller may also optionally include a display unit 116 and user interface unit 118 to facilitate interaction between the controller 100 and a user. The display unit 116 may be in the form of a cathode ray tube (CRT) or flat panel screen that displays text, numerals, graphical symbols or images. The user interface 118 may include a keyboard, mouse, joystick, light pen or other device. The cell processor module 101, memory 102 and other components of the system 100 may exchange signals (e.g., code instructions and data) with each other via a system bus 120 as shown in FIG. 1.

As used herein, the term I/O generally refers to any program, operation or device that transfers data to or from the system 100 and to or from a peripheral device. Every transfer is an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, external Zip drive or scanner as well as internal devices, such as a CD-ROM drive, CD-R drive or internal modem or other peripheral such as a flash memory reader/writer, hard drive.

The main processor MPE runs an operating system OS. The operating system OS provides a software platform on top of which other programs, referred to herein as application programs or applications 103, may run. The application program 103 may be implemented on the main processor element MPE and additional processor elements $APE_1 \ldots APE_N$ as threads including a main thread $Thr_M$ running on the main processor element MPE and additional threads $Thr_1 \ldots Thr_N$ running on the additional processor elements $APE_1 \ldots APE_N$. The processor module 101 may also include one or more memory flow controllers MFC to facilitate transfer of data between the processors and the main memory 102. The memory 102 may include data and code configured as described below. Specifically, the memory may include an application program 103. Various processes within the application program 103 may be broken down into subtasks. Such subtasks may be implemented a work queue array 104, work queues 106 and policy modules 108 each of which may include code, data or some combination of both code and data. A detailed discussion of examples of work queues, work queue arrays and policy modules may be found in commonly-assigned US Patent Application Publication 2007/0198628 (U.S. patent application Ser. No. 11/461,390), the entire contents of which are incorporated herein by reference.

Figure 2:
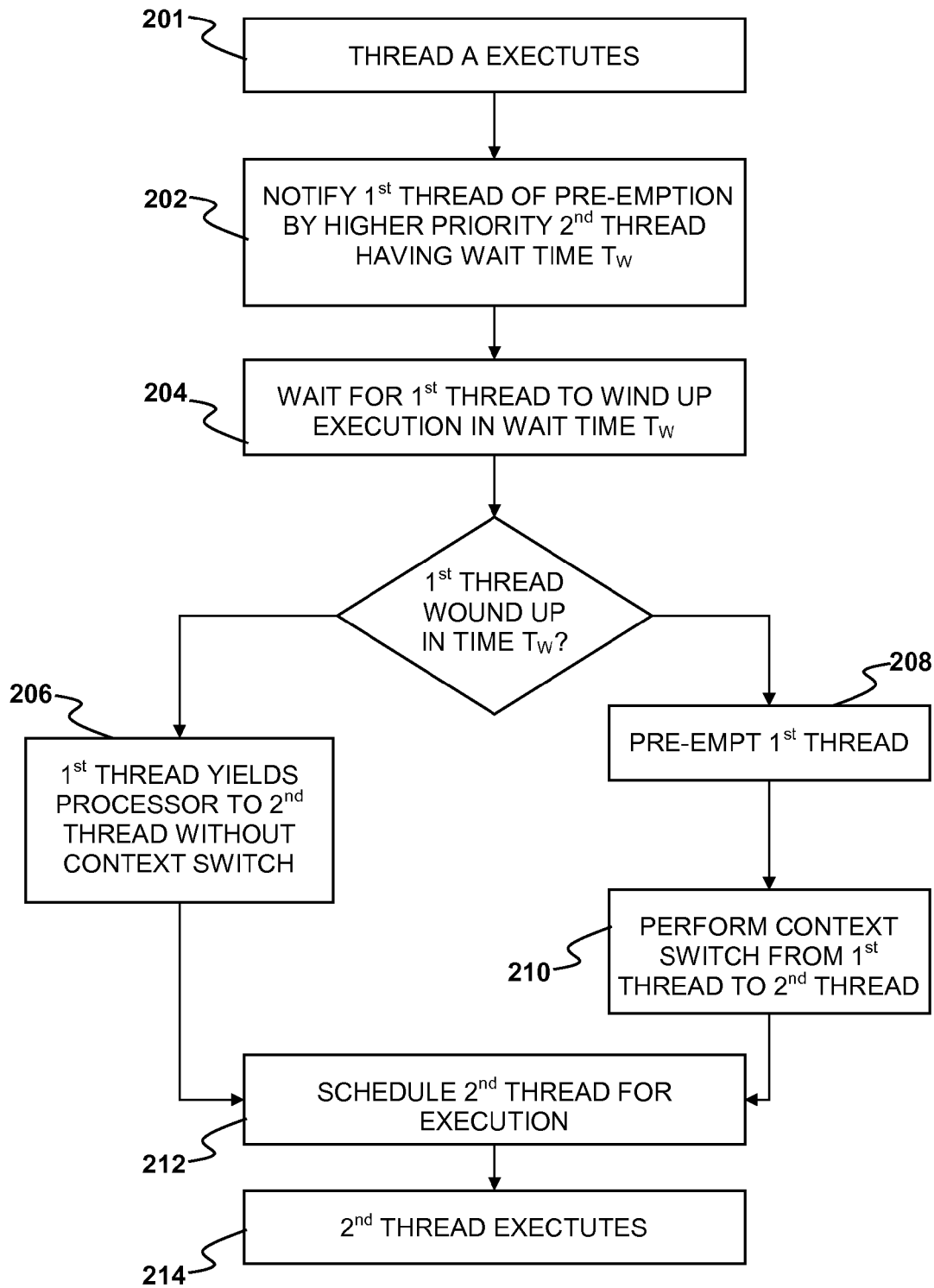
FIG. 2 is a flow diagrams illustrating multi-threaded processing according to an embodiment of the present invention.

The flow diagram of FIG. 2 illustrates an example of method 200 multi-threaded operation of a computer system like that shown in FIG. 1 according an embodiment of the present invention. According to the method a first thread may execute normally as indicated at 201. At 202 the operating system may notify a first thread of a pre-emption by a second thread having a higher priority than the first thread. By way of example, referring to FIG. 1 the first thread may be a thread running on one of the additional processor elements, e.g., thread $Thr_1$ running on additional processor element $APE_1$. Alternatively, the first thread may be running on the main processor element MPE. By way of example, the second thread may be part of the work queue 106. At 202 operating system OS may also notify the first thread of a time limit for pre-emption (referred to herein as a pre-emption wait time attribute) associated with the second thread. By way of example, the wait time attribute $T_W$ may be part of information about the thread stored, e.g., in the work queue array 104. The application 103 may be configured yield the one the processor(s) held by the first thread to the second thread within the wait-time attribute without saving a context of the first thread if the first thread $Thr_1$ can wind up within the time limit. As indicated at 204 the operating system OS may wait for the first thread to wind up execution. The first thread may wind up execution by completing its execution within the allotted wait time $T_W$. Alternatively, the first thread may wind up execution by saving data that it needs to save before exiting. In addition, in some situations, the first thread may wind up execution by removing a lock on a mutex 122 so that other threads may access to the mutex 122 after the first thread exits. If the first thread winds up its execution within the allotted wait time $T_W$, the first thread may yield the processor to the second thread without a context switch as indicated at 206. It is possible for the second thread to start earlier than its wait time, if the processor is yielded earlier.

If the first thread does not wind up execution within the wait time $T_W$, the first thread may be preempted as indicated at 208. A context switch from the first thread to the second thread may then be performed, as indicated at 210. It is advantageous for the operating system OS to perform the context switch, because the threads involved may be from separate processes and may not be able to access each other's memory areas. Subsequently, the second thread may be scheduled for execution on the processor, as indicated at 212 and may execute as indicated at 214.

The processor module 101 may manage multi-threaded operation as described above in response to data and program code instructions of the operating system OS and application program 103 which may be stored and retrieved by the memory 102 and executed by the processor module 101. Code portions of the operating system OS and/or application program 103 may conform to any one of a number of different programming languages such as Assembly, C++, JAVA or a number of other languages. The processor module 101 forms a general-purpose computer that becomes a specific purpose computer when executing programs such as the program code 103. Although the program code 103 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both. In one embodiment, among others, the operating system OS and/or program code 103 may include a set of processor readable instructions that implement a method having features in common with the method 200 of FIG. 2, described above.

Figure 3:
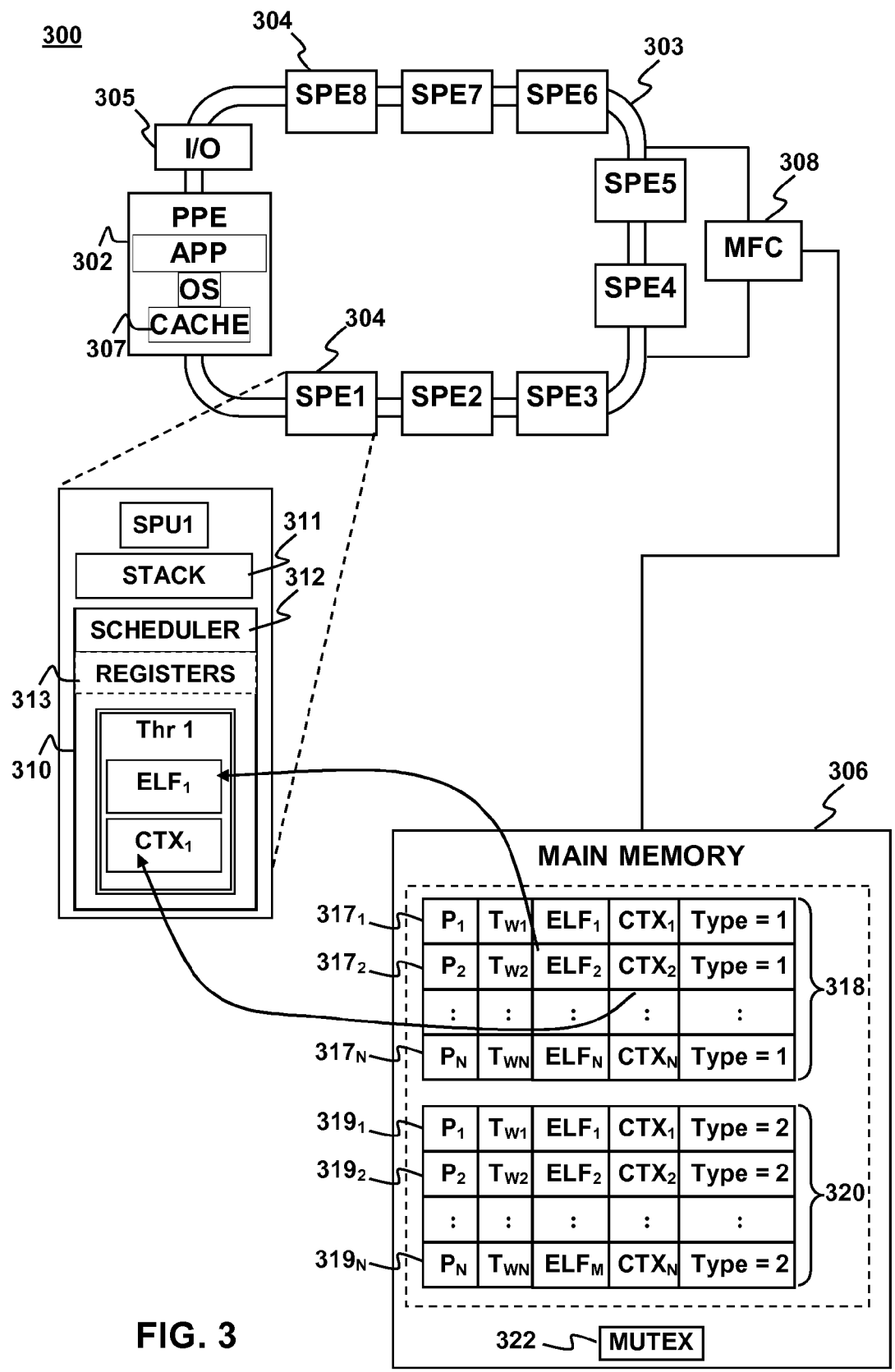
FIG. 3 is a block diagram of a computer system according to an embodiment of the present invention.

By way of example, and without loss of generality, the processor module 101 may be a cell processor. FIG. 3 is a schematic depiction of a cell processor computer system 300 according to an embodiment of the present invention. In the embodiment depicted in FIG. 3, the cell processor system 300 may include a power processor unit (PPU) 302 and several synergistic processing elements (SPE) 304. In FIG. 3, a single PPU 302 and eight SPE 304 are shown for the sake of example. Cell processors having two or more PPU and a greater or lesser number of SPU may be used in conjunction with embodiments of the present invention.

The computing system 300 may be a component of a device. Such devices include, but are not limited to personal computers, laptop computers, hand held internet browsers and/or email devices, Voice over Internet Protocol (VoIP) phones, video game consoles, hand-held video game devices, portable email devices, portable internet browsers and the like. In a preferred embodiment, the system 300 is a component of a video game console, such as the PlayStation3® from Sony Computer Entertainment, Inc. of Tokyo, Japan.

The PPU 302 acts as a controller for the SPE 304, which handle most of the computational workload. The PPU 302 may also be used to run conventional operating systems if it is sufficiently similar to other 64-bit PowerPC processors, and if the SPE 304 are designed for vectorized floating point code execution. The PPE may also include a cache 307. By way of example, the cache 307 may contain a 32 kilobyte instruction and data Level 1 cache and a 512 kilobyte Level 2 cache. A detailed description of a particular example of a cell processor architecture known as Cell Broadband Engine Architecture (CBEA) is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

The PPE 302 and SPE 304 can exchange code and data with each other over an exchange interface bus (EIB) 303. The PPE 302 and SPE 304 may also exchange code and data stored in a main memory 306, e.g., via an element interface bus (EIB) 303 and a memory flow controller (MFC) 308 such as a digital memory access (DMA) unit or the like. The EIB 303 may be a circular bus having two channels in opposite directions. The EIB 303 may also be connected to the cache 307, (e.g. the level 2 cache), the MFC 308, and a system interface 305 such as a FlexIO for external communications.

Each SPE 304 includes a processor, sometimes known as a synergistic processor unit (SPU) and a local memory 310. Code and data obtained from the main memory 306 can be loaded into the local memory 310 so that the SPE 304 can process tasks. Each SPE 304 may include registers 313 for instructions and or data used during execution of tasks. The local memory 310 of each SPE 304 may include a stack 311 to facilitate processing of tasks. As used herein and as is generally known, the term "stack" generally refers to a type of data structure in which items of data are removed in the reverse order from that in which they are added, so that the most recently added item is the first one removed. Such a structure is also sometimes known as a last-in, first-out (LIFO).

Each SPE 304 may have a number of features that are different from conventional processors such as the PPE 302. For example, a conventional processor allows code to address a large memory space, and transparently caches the memory to the processor's smaller cache memory. Unlike conventional processors such as the PPE 302, an SPE 304 generally lacks a cache hierarchy. The lack of a cache hierarchy makes throughput to the main memory 306 much faster for an SPE 304 than for a conventional processor. Access to the local memory 310 may be even faster as long as the SPE 304 has been explicitly programmed to DMA data to or from the local memory 310.

In some embodiments, the local memory 310 of each SPE 304 may contain a software scheduler program 312. Preferably, the scheduler program 312 takes up only a small fraction of the total memory space available in each local memory 310 (e.g., less than about 1% of each SPE local memory). The heart of the scheduler program 312, often referred to as a "Kernel", may take up as little as about 2 KB resident on each SPE 304. For a 256K local memory, this represents about 0.8% SPE Local Store usage.

In embodiments of the present invention, the PPE 302 may be programmed with an operating system OS. The operating system OS provides a software platform on top of which other programs, e.g., a application program APP, may run. Embodiments of the present invention may take advantage of the fact that a program, such as the application APP often already has a significant amount of its context data resident in main memory 306. In such cases it may therefore be redundant for the operating system OS to do a context switch. For example, in the particular case of the cell processor shown in FIG. 3, the local store 310 of a SPE 304 may not be large enough to store everything that the corresponding SPU will need. Some code and/or data associated with the thread may be stored in main memory 306 where it can be managed by the application APP that is running the thread. For example, the main memory 306 may store thread data 317 for a plurality of threads $317_1 \ldots 317_N$. The thread data may include priorities $P_1 \ldots P_N$, executable linkable files $ELF_1 \ldots ELF_N$ and context data $CTX_1 \ldots CTX_N$ correspondingly associated with the threads $317_1 \ldots 317_N$.

In prior art multi-threading systems, if a higher priority thread is waiting and ready, the OS will go through a context save and store. This is unacceptable on certain multi-processor systems, such as cell processors, where the SPE context switch is much more expensive than a context switch of a typical multi-threaded processor such as PowerPC or X86. In embodiments of the present invention, by contrast, the threads $317_1 \ldots 317_N$ may have associated with them corresponding wait-time attributes $T_{W1} \ldots T_{W2}$. Each wait-time attribute $T_{W1} \ldots T_{W2}$ specifies how long the corresponding thread can wait before pre-empting a lower priority thread.

In embodiments of the present invention, two or threads may be grouped together into a thread group. For example, as illustrated in FIG. 3, threads $317_1 \ldots 317_N$ may be grouped together in a first thread group 318 and threads $319_1, 319_2 \ldots 319_N$ may be grouped together in a second thread group 320. Each group may have a priority and wait time attribute associated with it. The priorities and wait time attributes for the threads within a group may be the same as each other or may be different from each other depending on the nature of the thread group.

In some embodiments of the present invention, two or more threads may be grouped together in a thread group in such a way that they may be scheduled and/or unscheduled independently or all together. There are advantages to being able to schedule and/or unscheduled threads independently. For example in SPURS, five different SPU threads are typically ganged together as a single SPURS instance. In such a case, either all five SPU threads are miming on the SPUs or they are not. If some high-priority thread needs to run on one SPU all five SPU threads in the SPURS thread group must be swapped out so that the high-priority thread can run. Not all thread groups need to work this way, however. In the context of embodiments of the invention, it is useful for the operating system OS to be able to determine whether a thread group is ganged or independent. Therefore, in embodiments of the invention thread groups may be characterized by a thread group type. Specifically, the thread group type may identify whether the thread group is constant-sized or variable-sized. In the case of a constant-sized thread group, the threads may be gang-scheduled as described above. In the case of a variable-sized thread group, the number of threads in the group may vary as determined by the OS.

Some SPU systems, such as SPURS, can execute application code without depending on having a fixed number of SPU threads. In this case, a variable-sized SPU thread group may be used. Other systems may require always a specific number of SPUs. In this case, a constant-sized group would be used.

The variable- and constant-sized thread groups may have some upper limit on the number of threads in the group, e.g. up to 6 in the case of certain cell processor implementations. The upper limit on the number of threads in a group is generally determined by the number of available limited-core processors (e.g., SPUs in the case of a Cell Processor). The number of available SPUs may be less than the total number of SPUs physically present in the Cell Processor, e.g., for reasons having to do with yield and/or operating system configuration. In the particular example of a cell processor, the operating system may runtime manage the number of SPU Threads assigned to variable Groups. Examples of scheduling of SPU Thread groups, such as job streaming (also known as SPU Task Management (STM)), are described in detail, e.g., in commonly-assigned US Patent Application Publication 2007/0198628 (U.S. patent application Ser. No. 11/461,390), the entire contents of which are incorporated herein by reference. A new SPU Thread may be added to a variable Group, e.g., by starting a fresh copy of its ELF sections on a SPU or other processor. The default SPU Thread may be configured, e.g., with parameters specified to the OS when the application created the SPU Thread group.

Due to the independent, one-at-a-time, nature of thread scheduling in a variable-sized thread group, threads executing in a variable-sized Group may always yield with no context save.

Constant-sized groups may preferably yield with no-context-save, but may fall back on a full context-save if they are preempted by the OS. However, as discussed above, the possibility exists that a thread may not be able to exit within a given wait-time attribute. In such a case, the thread may be preempted. However, if a thread in a variable-sized group is preempted, its context must be saved and restored. It is therefore useful to have a thread Group attribute for a preemption policy implemented by the OS. Specifically, the thread group attribute may specify whether threads in a given group are to be a) preempted as a group, or b) preempted individually. In the example depicted in FIG. 3, threads to be preempted as a group are indicated by type=1 and threads to be preempted individually are indicated by type=2. Specifically, threads $317_k \ldots 317_N$ in thread group 318 are to be preempted as a group and threads $319_k \ldots 319_N$ in the second thread group 320 are to be preempted individually. It is noted that although the concept of a thread group type is discussed herein in the context of a Cell processor example, those of skill in the art will recognize that the concept may be applied to any type of multi-threaded computer processing.

If a thread is preempted individually, other threads within its group may communicate with each other safely. The ability to preempt threads individually may be useful, e.g., where there is no a priori knowledge about competing threads. The ability to preempt threads individually may be potentially useful for unknown Cell processor applications having two or more independent processes with their own internal thread usages and each process involves one or more SPEs. In embodiments of the invention, it is often desirable to carefully choose the point at which a given preempted thread drops out. For example, a thread may drop out when the scheduler 312, e.g., a SPURS or SPMM kernel, is executing if there is no inter SPE communication taking place at that point. Alternatively, the application APP may determine safe point for a preempted thread to drop out.

Figure 4A:
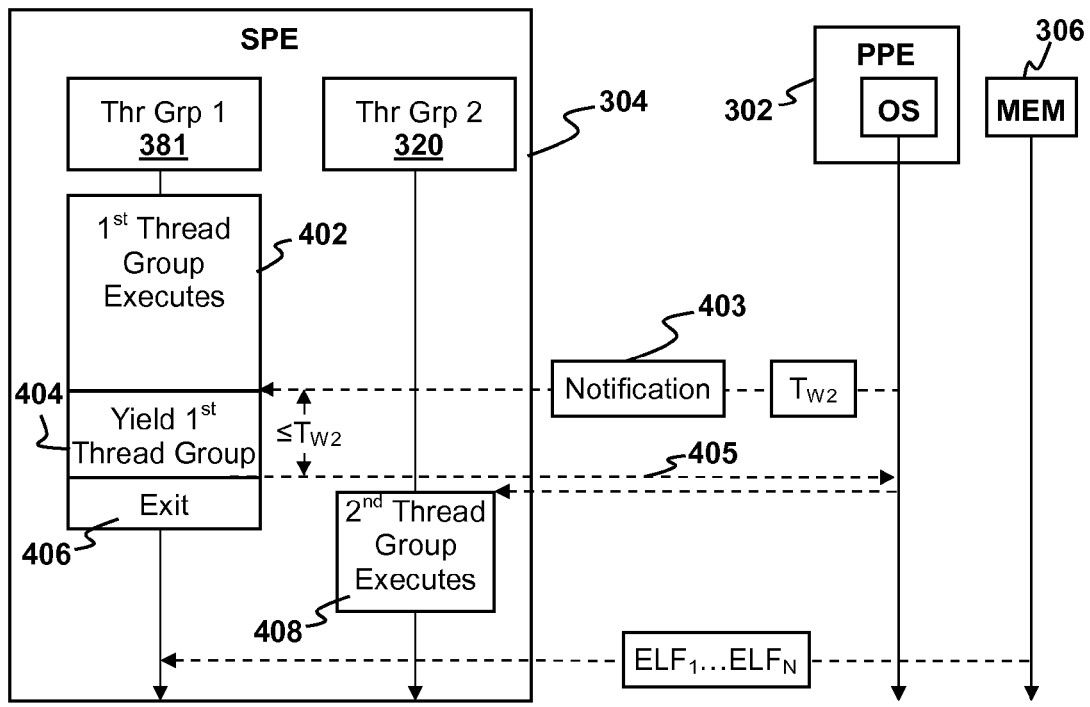
FIGS. 4A-4B are timing diagrams illustrating multi-threaded processing according to embodiments of the present invention.
Figure 4B:
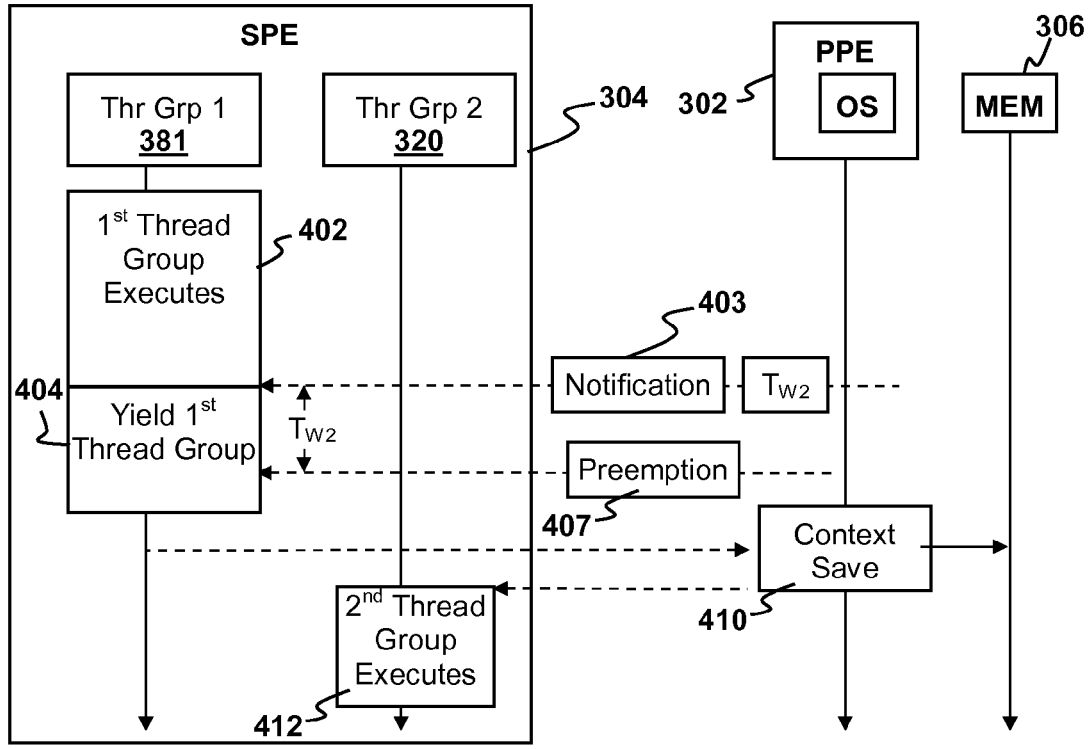

Operation of the system 300 in accordance with embodiments of the present invention may be understood by simultaneously referring to FIG. 3 and FIGS. 4A-4B. By way of example, the first thread group 318 may be executing on an SPE 304 as indicated at 402 in FIG. 4A and FIG. 4B. The second thread group 320 may become available while the first thread group 318 is running on the SPE 304. For the sake of example, suppose that the first thread group 318 has a wait time attribute $T_{W1}=1000$ microseconds, a priority $P_1=10$ and a thread group type=1 and that the second thread group 320 has a wait time attribute $T_{W2}=50$ microseconds, a priority $P_2=1$ and a thread group type=2. In this case, the first thread group 318 has a lower priority $P_1$ than the priority $P_2$ of a second thread group 320. When the second thread group 320 becomes ready for execution, the operating system OS may signal the application APP and start a timer set according to the 50-microsecond wait-time attribute $T_{W2}$ of the high-priority second thread group 320.

As shown in FIG. 4A, The operating system OS may notify the SPE 304 running the first thread group 318 (or whatever process is running the first thread group 318) by sending a preemption notification 403 that warns the SPE 304 of a pending preemption of first thread 318 (or its parent process) by the second thread group 320. The operating system OS may also notify the SPE 304 of the allotted wait time $T_{W2}$ in which to yield. By way of example, the operating system OS may call a call-back associated with the running lower priority thread. In the particular case of a cell processor, the call-back may be implemented as a function call on the PPU process that owns the first thread group 318. The function call may include the wait time attribute $T_{W2}$ as a parameter. The aforementioned PPU process may be the application APP or a process within the application. The first thread group 318 or application APP may be configured so that upon receipt of the preemption notification 403, the first thread 318 thread may complete execution, save data that needs to be saved or take other appropriate action in response to yield instructions as indicated at 404, and then exit at 406 without performing a context save. As discussed above, this procedure is referred to herein as a no-context-save yield. The no-context save yield may include removing a spin lock on a mutex 322 prior to exiting. Alternatively, the instructions 404 implementing the yield may include one or more instructions that, when executed, maintain the first thread in a ready state until a subsequent call to execute the first thread. It is possible for the second thread group 320 to start before its 50-microsecond wait time has elapsed, if the SPE 304 yields earlier. The first thread group 318 (or application APP) may notify the OS that it has exited as indicated at 405, whereupon the operating system OS may deposit the second thread group 320 into the SPE 304 for execution. The second thread may then execute as indicated at 408. Specifically, the operating system OS may notify the PPU 302 of the yield and the second thread group 320 may be immediately scheduled for execution.

The no-context-save yield instructions 404 may be configured so that the next time the first thread group 318 is to be swapped into the SPE 304 the application APP can load a fresh copy of the executable linkable files $ELF_1 \ldots ELF_N$ for the threads $317_1 \ldots 317_N$ in the first thread group 318 re-set to initialized values. In some embodiments, the no-context-save yield may be implemented at the operating system level, e.g., by an instruction that tells the OS to destroy the thread. When the destroyed thread is to be resumed, the application has to create the same thread. Although exits that destroy a thread have been implemented at the application level, it is believed to be novel to implement a no-context save yield at the OS level. In addition, an OS that supports a no-context-save yield natively is believed to be counterintuitive, because when the thread is to be resumed by the OS, the OS starts a fresh instance of the thread in the same way as when the thread was started for the first time. Intuitively, resuming a thread implies that there was some OS-maintained context to bring up so that the thread can continue where it left off. One of skill in the art would therefore consider it impossible to resume a thread in the absence of a context save. In embodiments of the present invention, by contrast, the application determines where it left off each time the thread is resumed.

In some circumstances, the first thread group may be unable to yield the SPE 304 within the allotted wait-time attribute $T_{W2}$. For example, as illustrated in FIG. 4B, if the SPE 304 does not yield within the 50-µs wait-time $T_{W2}$, the operating system OS may send a preemption command 407 to the SPE 304. The first thread group 318 is preempted, and context save 410 is then performed. The context save 410 may involve saving register values and program counter values and the like to main memory 306. The second thread group 320 may then execute as indicated at 412.

The wait-time attribute for a given thread may be determined empirically. In some embodiments, it may be desirable that the wait-time attribute be less than an amount of time required for a context switch. In embodiments of the present invention, the wait-time attributes for cooperative threads $T_{W1} \ldots T_{WN}$ running concurrently may be judiciously chosen so that higher-priority threads can be brought up and running significantly faster than would otherwise be possible using context switches. In fact, if the threads are sufficiently cooperative and the wait-time attributes $T_{W1} \ldots T_{WN}$ are properly chosen, the application APP may be configured in such a way as to avoid context switches entirely. It is noted that a default wait time attribute value of 0 for a given thread results in immediate preemption with context saves, which is the current behavior.

Advantages associated with embodiments of the invention may be seen upon considering the following example. As discussed above, certain multi-threaded applications may include a repeating high priority thread that is run at regular intervals of time. In prior art multi-threaded processing methods and systems, if this thread preempts a gang-scheduled thread group, all the threads in the group need to be swapped out even if the repeating thread needs only a single SPE. If all thread groups are gang-scheduled then there will be frequent interruptions in processing and a significant reduction in performance as the repeating thread regularly preempts gang-scheduled thread groups. The workarounds to avoid this are unsatisfactory. One workaround is to split up the thread group into one large group and one small group, so that the small group will be preempted by the periodic high priority thread. Unfortunately, this results in the application managing two separate workloads for each thread group. Another workaround is to avoid using one of the SPEs entirely except for the high-priority thread, so that the high priority thread has a dedicated SPE to use. Unfortunately, this makes the dedicated SPE unavailable for other work that it could otherwise be doing. If, however, threads may be individually swapped out as defined by the variable-sized thread group, the repeating thread group may preempt a few individual threads, thereby allowing other related threads to continue executing and freeing up valuable processor resources.

According to embodiments of the present invention, systems and software implementing the features described herein may be made backwards-compatible with prior software versions. For example, in some Cell processor implementations, the interface between the operating system and the application is a set of software instructions referred to as Syscalls. Currently, an SPU thread is defined by some data structure and the thread is initiated through a corresponding Syscall instruction to that data structure. The data structure may include attributes of the thread, pointers to code and/or data associated with the thread and other information. Embodiments of the present invention may be implemented using similar data structures configured to accommodate additional data, such as the wait-time attribute and thread group type. In embodiments of the invention new Syscalls may be created for such data structures. However, the new data structures may be configured such that they will also work with the existing Syscalls. Similarly, the new Syscalls may be configured to work with the old data structures. In this manner, the new operating system may be made backwards compatible with older applications.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a computer system having one or more processors coupled to a memory, a method for multi-threaded processing, comprising:
    notifying one or more of the processors running a first thread or thread group of a pre-emption by a second thread or thread group characterized by a higher priority than the first thread;
    notifying the one or more of the processors of a time limit for pre-emption associated with the second thread or thread group, wherein the time limit for pre-emption specifies how long the second thread or thread group can wait before preempting the first thread or thread group, wherein the time limit is less than a time needed for a context switch from the first thread or thread group to the second thread or thread group; and
    yielding the one or more of the processors to the second thread or thread group within the time limit without saving a context of the first thread or thread group if the first thread or thread group can wind up within the time limit, or performing a context switch from the first thread or thread group to the second thread or thread group if the first thread or thread group cannot wind up within the time limit.

2. A non-transitory computer-readable medium having a set of computer readable instructions embodied therein, the computer-readable instructions being configured to implement a method for a multi-threaded processing on a computer system having one or more processors coupled to a memory, the computer-readable instructions comprising:
    one or more pre-emption-notification instructions that, when executed, notify one or more of the processors running a first thread or thread group of a pre-emption by a second thread or thread group characterized by a higher priority than the first thread or thread group;
    one or more wait-time-notification instructions that, when executed, notify the first thread or thread group of a time limit for pre-emption associated with the second thread or thread group, wherein the time limit for pre-emption specifies how long the second thread or thread group can wait before preempting the first thread or thread group, wherein the time limit is less than a time needed for a context switch from the first thread or thread group to the second thread or thread group; and
    one or more yield instructions that, when executed, yield the one or more of the processors to the second thread or thread group within the time limit without saving a context of the first thread or thread group if the processor can yield the first thread or thread group within the time limit or perform a context switch from the first thread or thread group to the second thread or thread group if the processor cannot yield the first thread or thread group within the time limit.

3. The computer-readable medium of claim 2 wherein the pre-emption-notification instructions are part of an operating system for the computer system.

4. The computer-readable medium of claim 2 wherein the wait-time-notification instructions are part of an operating system for the computer system.

5. The computer-readable medium of claim 2 wherein the yield instructions include one or more instructions that are part of an operating system for the computer system.

6. The computer-readable medium of claim 2 wherein the yield instructions include one or more instructions that, when executed, unlock a mutex previously locked by the first thread or thread group before yielding the one or more of the processors to the second thread or thread group.

7. The computer-readable medium of claim 2 wherein the yield instructions include one or more instructions that, when executed, maintain the first thread in a ready state until a subsequent call to execute the first thread or thread group.

8. The computer-readable medium of claim 2, wherein the computer-readable instructions further comprise one or more instructions that, when executed, group the first thread with one or more other threads in a group characterized by a thread group type, wherein the thread group type is either a constant-sized group of two or more threads that are gang-scheduled or a variable-sized group of two or more threads that can be scheduled and/or unscheduled one at a time.

9. The computer-readable medium of claim 8 wherein, if the thread group type is variable-sized, the yield instructions are configured to yield only the first thread and no other threads in the group if only the first thread is pre-empted.

10. The computer-readable medium of claim 8 wherein, if the thread group type is constant-sized, the yield instructions are configured to yield the first thread and all other threads in the group even if only the first thread is pre-empted.

11. The computer-readable medium of claim 2 wherein the context switch includes saving context data associated with the first thread in the memory.

12. The computer-readable medium of claim 2 wherein the yield instructions include one or more instructions that, when executed, schedule the second thread for execution on the one or more of the processors.

13. A computer system, comprising:
    one or more processors; and
    a memory coupled to the one or more processors,
    wherein the computer system is programmed with a set of computer-readable instructions configured to implement a method for a multi-threaded processing, the computer-readable instructions comprising:
    one or more pre-emption-notification instructions that, when executed, notify one or more of the processors running a first thread or thread group of a pre-emption by a second thread or thread group characterized by a higher priority than the first thread or thread group;
    one or more wait-time-notification instructions that, when executed, notify the one or more of the processors of a time limit for pre-emption associated with the second thread or thread group, wherein the time limit for pre-emption specifies how long the second thread or thread group can wait before preempting the first thread or thread group, wherein the time limit is less than a time needed for a context switch from the first thread or thread group to the second thread or thread group; and one or more yield instructions that, when executed, yield the one or more of the processors to the second thread or thread group within the time limit without saving a context of the first thread or thread group if the one or more of the processors can yield the first thread or thread group within the time limit or perform a context switch from the first thread or thread group to the second thread or thread group if the one or more of the processors cannot yield within the time limit.

14. The computer system of claim 13 wherein the one or more processors include two or more processors.

15. The computer system of claim 14 wherein the two or more processors include a power processor element and one or more synergistic processor elements, wherein the power processing element is a conventional general purpose processing element configured to control a synergistic processing element and wherein the synergistic processor element includes a register and a local memory.

16. The computer system of claim 13 wherein the pre-emption-notification instructions are part of an operating system for the computer system.

17. The computer system of claim 13 wherein the wait-time-notification instructions are part of an operating system for the computer system.

18. The computer system of claim 13 wherein the yield instructions include one or more instructions that are part of an operating system for the computer system.

19. The computer system of claim 13 wherein the yield instructions include one or more instructions that, when executed, unlock a mutex previously locked by the first thread or thread group before yielding the one or more of the processors to the second thread.

20. The computer system of claim 13 wherein the yield instructions include one or more instructions that, when executed, maintain the first thread or thread group in a ready state until a subsequent call to execute the first thread.

21. The computer system of claim 13, wherein the computer-readable instructions further comprise one or more instructions that, when executed, group the first thread with one or more other threads in a group characterized by a thread group type, wherein the thread group type is either a constant-sized group of two or more threads that are gang-scheduled or a variable-sized group of two or more threads that can be scheduled and/or unscheduled one at a time.

22. The computer system of claim 21 wherein, if the thread group type is variable-sized, the yield instructions are configured to yield only the first thread and no other threads in the group if only the first thread is pre-empted.

23. The computer system of claim 21 wherein, if the thread group type is constant-sized, the yield instructions are configured to yield the first thread and all other threads in the group even if only the first thread is pre-empted.

24. The computer system of claim 13 wherein the context switch includes saving context data associated with the first thread or thread group in the memory.

25. The computer system of claim 13 wherein the yield instructions include one or more instructions that, when executed, schedule the second thread or thread group for execution on the one or more of the processors.

26. The computer system of claim 13 wherein the one or more processors include a power processing element and one or more synergistic processing elements, wherein the power processing element is a conventional general purpose processing element configured to control a synergistic processing element and wherein the synergistic processor element includes a register and a local memory.

27. The computer system of claim 13 wherein the one or more processors include a multi-core processor.

28. The computer system of claim 13 wherein the system is a component of a personal computer, laptop computer, hand held internet browser device, hand-held email device, Voice over Internet Protocol (VoIP) phones, video game console, or hand-held video game device.

29. The computer system of claim 28 wherein the one or more processors include a power processing element and one or more synergistic processing elements and the device is a video game console, wherein the power processing element is a conventional general purpose processing element configured to control a synergistic processing element and wherein the synergistic processor element includes a register and a local memory.

30. The computer system of claim 13 wherein the one or more processors include an asymmetric multi-core processor.

31. The computer system of claim 30 wherein the multi-core processor includes one or more limited cores of a type that cannot perform a full thread context switch on itself.

32. The computer system of claim 31 wherein, if a context switch is required for one or more of the limited cores, one or more remaining cores of the multi-core processor must perform context switches in full or in part on behalf of the one or more limited cores requiring the context switch.

33. The computer system of claim 32 wherein a context switch of the limited core processor results in undesired overhead for the computer system.

* * * * *